(12) United States Patent
Scharmann et al.

(10) Patent No.: US 6,622,362 B1
(45) Date of Patent: Sep. 23, 2003

(54) WEATHER STRIP INSERTION MASK

(75) Inventors: Marco Scharmann, Cranberry Township, PA (US); Jeffrey A. Lint, Alquippa, PA (US)

(73) Assignee: Veka, Inc., Fombell, PA (US)

( * ) Notice: Subject to any disclaimer, the term of this patent is extended or adjusted under 35 U.S.C. 154(b) by 0 days.

(21) Appl. No.: 10/196,776

(22) Filed: Jul. 17, 2002

(51) Int. Cl.⁷ .................................................. B23P 19/02
(52) U.S. Cl. .......................................... 29/235; 29/451
(58) Field of Search ........................ 29/235, 451, 819, 29/820, 429, 430, 779, 782, 787, 789

(56) References Cited

U.S. PATENT DOCUMENTS

| | | | |
|---|---|---|---|
| 4,528,736 A | * 7/1985 | Hope et al. | 29/235 |
| 5,829,113 A | * 11/1998 | Socci et al. | 29/451 |
| 6,385,833 B1 | * 5/2002 | Albanese et al. | 29/235 |

* cited by examiner

*Primary Examiner*—Joseph J. Hail, III
*Assistant Examiner*—Daniel Shanley
(74) *Attorney, Agent, or Firm*—Cohen & Grigsby, P.C.

(57) ABSTRACT

An insertion mask (10) for installing weather strip (12) in the pockets (106 and 108) of an extrusion (14). The mask (10) includes a guide block (16) that defines an internal passageway (18). Roller blocks (82 and 88) are secured to guide block (16) and rollers (96 and 102) are rotatably connected to roller blocks (82 and 88). Rollers (96 and 102) force the weather strip (12) into the pockets (106 and 108) as extrusion (14) passes through the insertion mask (10).

13 Claims, 5 Drawing Sheets

WEATHER STRIP INSERTION MASK

BACKGROUND OF THE INVENTION

1. Field of the Invention

The presently disclosed invention concerns the assembly of architectural components and, more particularly, the assembly of weather stripping in windows and door components.

2. Description of the Prior Art

For many years, weather stripping have been commonly used to weatherproof gaps between window sashes, window frames, door frames and the like. However, the pre-assembly of weather stripping has been a persistent problem. In some cases, the weather stripping is assembled when the window or door is installed and is not pre-assembled at all.

In most cases when weather stripping has been pre-assembled, the assembly process has employed various types of jigs and fixtures. Such jigs and fixtures have generally been designed to accommodate a broad variety of architectural shapes and sizes, resulting in a somewhat mechanically complicated and delicate design that required continual adjustment during use. Also, the mechanical complexity made such jigs and fixtures somewhat difficult to set up whenever there was a change-over over to a different architectural shape. All of this tended to cause increased delay and costs during the manufacturing process.

Accordingly, there was a need in the prior art for a device that could be easily and reliably used to pre-assemble weather stripping to architectural shapes during the manufacturing process.

SUMMARY OF THE INVENTION

In accordance with the invention herein disclosed, an insertion mask for installing weather stripping in a lineal extrusion includes a guide block that defines a passageway therein. The passageway of the guide block has a profile size and shape such that the guide block receives the lineal extrusion in the passageway while limiting lateral movement of the lineal extrusion. The insertion mask also includes a roller block is secured to the guide block and a roller and axle assembly that is connected to the roller block. The roller angularly rotates on the axle and is positioned such that the perimeter of the roller is located with respect to the walls of the passageway. As the lineal extrusion and the weather stripping are passed through the insertion mask, the insertion mask urges the weather stripping into a pocket that is defined in the lineal extrusion.

Preferably, the axle of the roller and axle assembly is substantially orthogonal to the longitudinal axis of the passageway, but is adjustable with respect to the longitudinal axis so as to allow angular adjustment of the roller with respect to the longitudinal axis of the passageway.

Also preferably, the guide block includes a base that defines a part of the internal passageway and a feed block that defines the rest of the internal passageway. The feed block includes an external face and an internal face and the portion of the internal passageway that is defined in the feed block intersects the external face to form an input portal and also intersects the internal surface to define an output portal. The dimension of the output portal are smaller than the dimensions of the input portal so that at least a portion of the internal passageway that is in the feed block is funnel-shaped.

Most preferably, the insertion mask further includes at a second roller block and at least a second roller ad axle assembly such that the insertion mask can install multiple weather strips in one pass of the lineal extrusion through the insertion mask.

Other objects, features and advantages of the presently disclosed invention will become apparent as a description of a presently preferred embodiment hereof proceeds.

BRIEF DESCRIPTION OF THE DRAWINGS

A presently preferred embodiment of the disclosed invention is shown and described in connection with the following drawings wherein.

DESCRIPTION OF A PRESENTLY PREFERRED EMBODIMENT OF THE INVENTION

Figure 1:
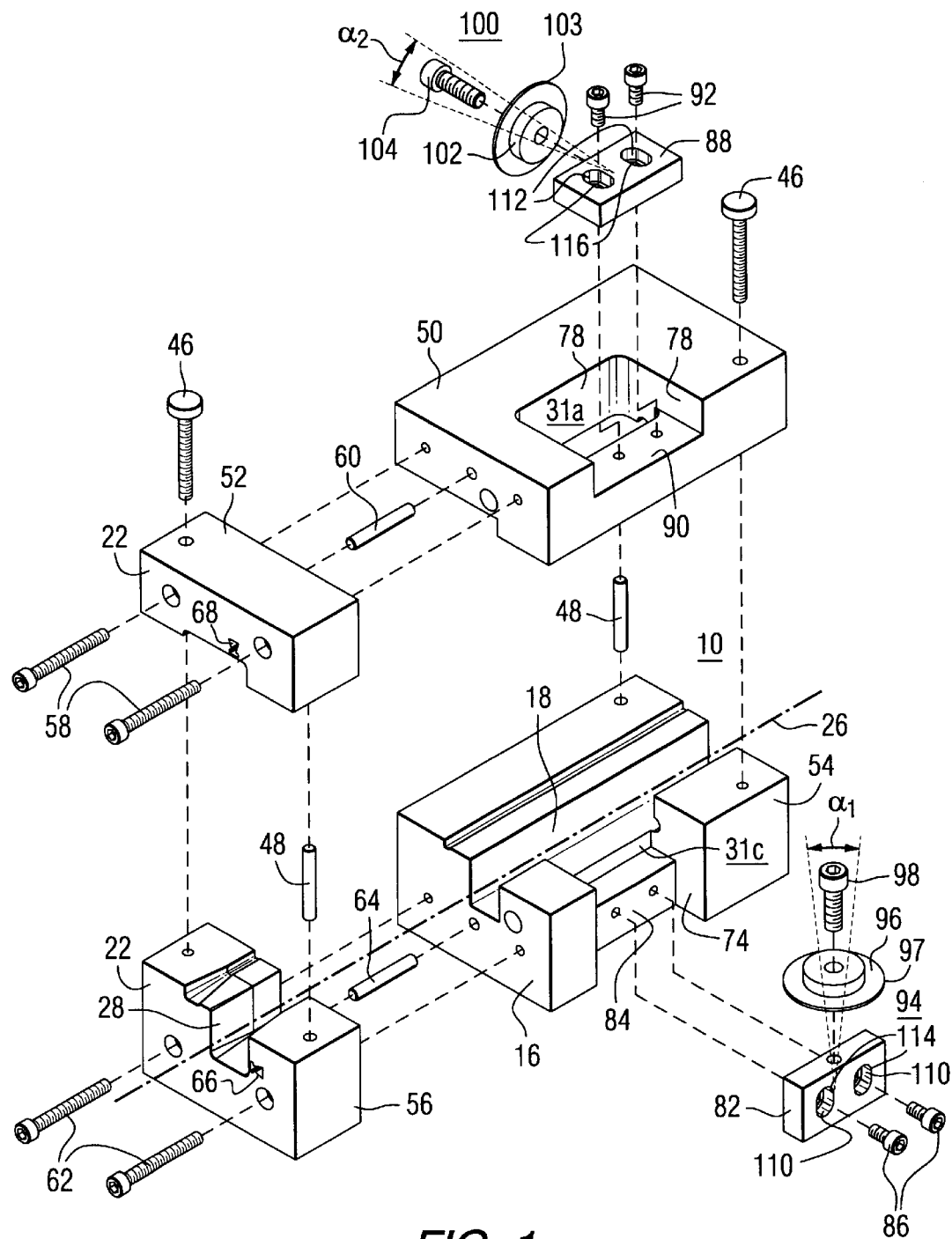
FIG. 1 is an exploded projection drawing of an insertion mask in accordance with the disclosed invention.

FIGS. 1–5 show an insertion mask 10 for the pre-assembly of weather stripping 12 with an architectural shape illustrated generally as window component extrusion 14. In contrast with jigs and fixtures known in the prior art, insertion mask 10 has a dedicated design so that it is useful to assemble weather stripping into a single style of extrusion 14 of a given size. For each different size and shape of component extrusion 14, a separate insertion mask 10 is designed and constructed.

The insertion masks 10 corresponding to the respective architectural shapes and sizes are held in inventory so that they can be quickly and easily selected at the time of changeover to the corresponding component extrusion 14. The initial effort and cost of designing and constructing an entire family of insertion masks 10 disclosed herein is greater than that associated with the use of prior art jigs and fixtures. However, it has been found that the manufacturing efficiencies gained through the use of the disclosed insertion mask far outweigh the initial investment in effort and cost and afford a substantial improvement in the pre-assembly of weather stripping with component extrusions.

As shown in FIGS. 1–5, insertion mask 10 includes a guide block 16 that defines an internal passageway 18 having walls 20 therein. Guide block 16 further defines a feed face 22 and an exit face 24 with feed face 22 being oppositely disposed from exit face 24. Passageway 18 is generally aligned on a longitudinal axis 26 that extends from feed face 22 to exit face 24 such that internal passageway 18 intersects feed face 22 to define an entry portal 28 and intersects exit face 24 to define an exit portal 30.

The lateral profile of passageway 18 at a given longitudinal position along longitudinal axis 26 is defined according to the cross-section of passageway 18 that is orthogonal to longitudinal axis 26. In the design and manufacture of guide block 16, internal passageway 18 is made to have a lateral profile with a shape and dimensions that generally correspond to the shape and dimension of a selected component extrusion. For the sake of illustration, the preferred embodiment of the insertion mask 10 shown in FIGS. 1–5 is designed to correspond to the profiles of component extrusion 14. However, the scope of the presently disclosed invention is not limited thereto and should be understood to generally include component extrusions of all shapes and sizes for which it is necessary to install weather stripping.

The shape and dimensions of the lateral profile of passageway 18 correspond, within acceptable tolerances, to the shape and dimensions of the lateral profile of the particular component extrusion 14 that is to be pre-assembled with weather stripping. As will become apparent as the description of the preferred embodiment proceeds, the component extrusion 14 is passed longitudinally through passageway 18, moving in the direction from the entry face 22 and portal 28 toward the exit face 24 and portal 30. To facilitate the intake of the component extrusion 14 at the entry portal 28, passageway 18 is funneled or flared in the region of passageway 18 that is longitudinally adjacent to entry portal 28.

Preferably, guide block 16 defines a first wheel well 31*a* with sides 74 and a mounting surface 84 and a second wheel well 31*c* having sides 78 and a mounting surface 90. As will be further apparent as the description of the presently preferred embodiment proceeds, wheel wells 31*a* and 31*c* accommodate rollers 96 and 102 that force the weather strips 12 into the extrusion pockets 106 and 108 of the extrusion 14.

To further facilitate the manufacture and maintenance of passageway 18 in guide block 16, guide block 16 is preferably assembled from several components. Specifically, guide block 16 includes an upper portion 32 and a lower portion 34. Upper portion 32 includes a top surface 36 and a lower face 38 having a channel 39. Lower portion 34 includes a bottom surface 40 and an upper face 42 having a channel 44. Upper portion 32 is secured to lower portion 34 by means of machine bolts 46 and guide pins 48. When upper portion 32 and lower portion 34 are assembled together, the lower face 38 of upper portion 32 opposes the upper face 42 of lower portion 34 such that channels 39 and 44 cooperate to form passageway 18 having the desired lateral profile.

Also in accordance with the presently preferred embodiment, upper portion 32 is assembled from upper base 50 and upper guide 52. Similarly, lower portion 34 is assembled from lower base 54 and lower guide 56. Upper base 50 is secured to upper guide 52 by screws 58 and guide pin 60 and lower base 54 is secured to lower guide 56 by screws 62 and guide pin 64.

As will be hereinafter further discussed, lower guide 56 of lower portion 34 includes a first weather strip passageway 66 and upper guide 52 of upper portion 32 includes a second weather strip passageway 68. First weather strip passageway 66 intersects feed face 22 to form an entry portal 70 and second weather strip passageway 68 intersects feed face 22 to form an entry portal 72. First, weather strip passageway 66 terminates in a side 74 of lower base 54 to define an exit portal 76. Second weather strip passageway 68 terminates in a side 78 to define an exit portal 80.

The presently disclosed embodiment of insertion mask 10 further includes a first roller block 82 that is secured to a mounting surface 84 of guide block 16 by bolts 86. Similarly, a second roller block 88 is secured to a mounting surface 90 of guide block 16 by bolts 92.

A first roller and axle assembly 94 that includes roller 96 and a bolt that also serves as an axle 98 is secured to first roller block 82. Roller 96 defines a perimeter 97 and is mounted on axle 98 such that roller 96 angularly rotates on axle 98.

Similarly, a second roller and axle assembly 100 that includes a roller 102 and a bolt that also serves as an axle 104 is secured to second roller block 88. Roller 102 defines a perimeter 103 and is mounted on axle 104 such that roller 102 angularly rotates on axle 104. In the preferred embodiment of FIGS. 1–5, axles 98 and 104 are substantially orthogonal to longitudinal axis 26 of passageway 18.

The width W1 and W2 and the diameter D1 and D2 of roller 96 and 102 respectively, are selected according to the particular shape and size of the extrusion for which the insertion mask is designed. Generally, rollers 98 and 102 are sized such that the perimeters 97 and 103 of rollers 96 and 102 respectively are at a predetermined location with respect to the walls 20 of passageway 18. Accordingly, the diameters D1 and D2 of rollers 96 and 102 are selected in combination with the position of mounting surfaces 84 and 90 with respect to walls 20 of passageway 18 such that the perimeters 97 and 103 of rollers 96 and 102 respectively are at a predetermined distance from the walls 20 of passageway 18.

Figure 2:
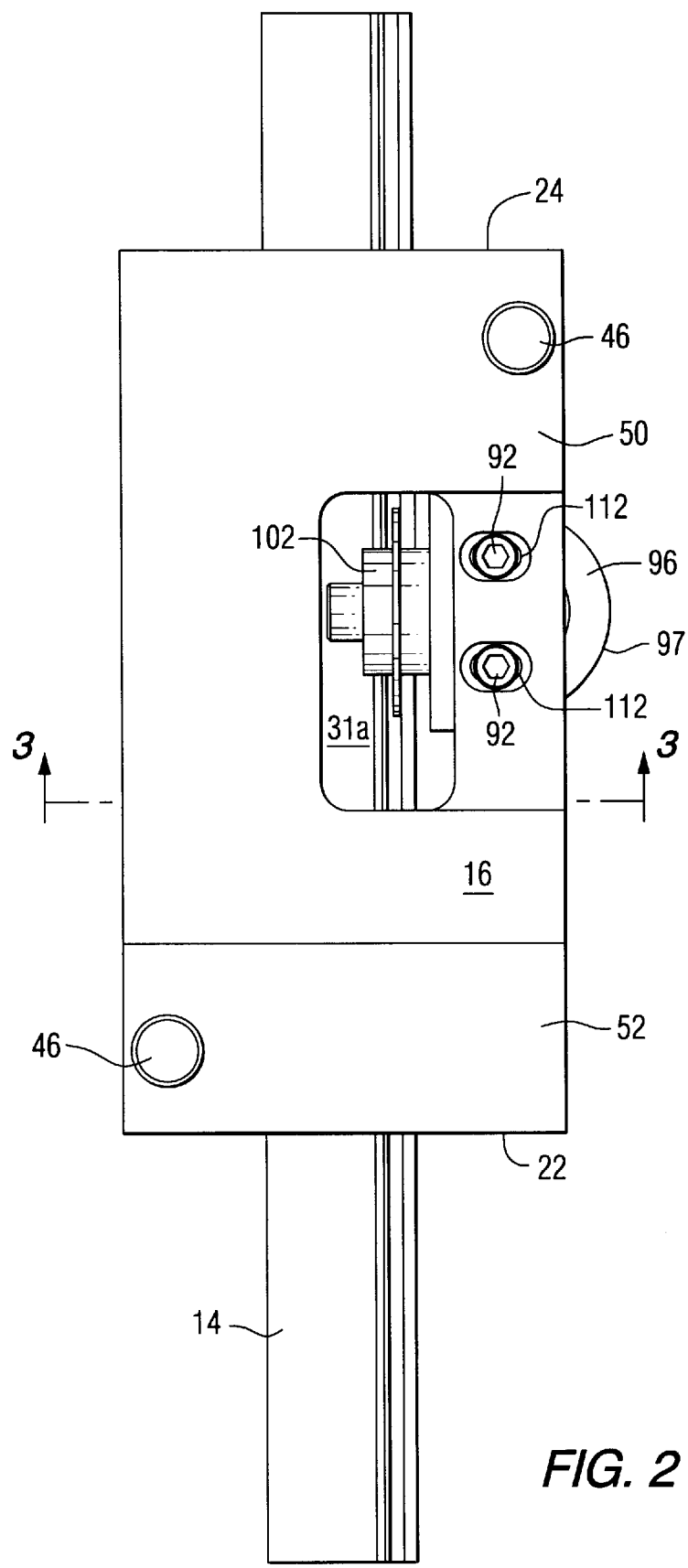
FIG. 2 is a plan view of the insertion mask shown in FIG. 1.
Figure 3:
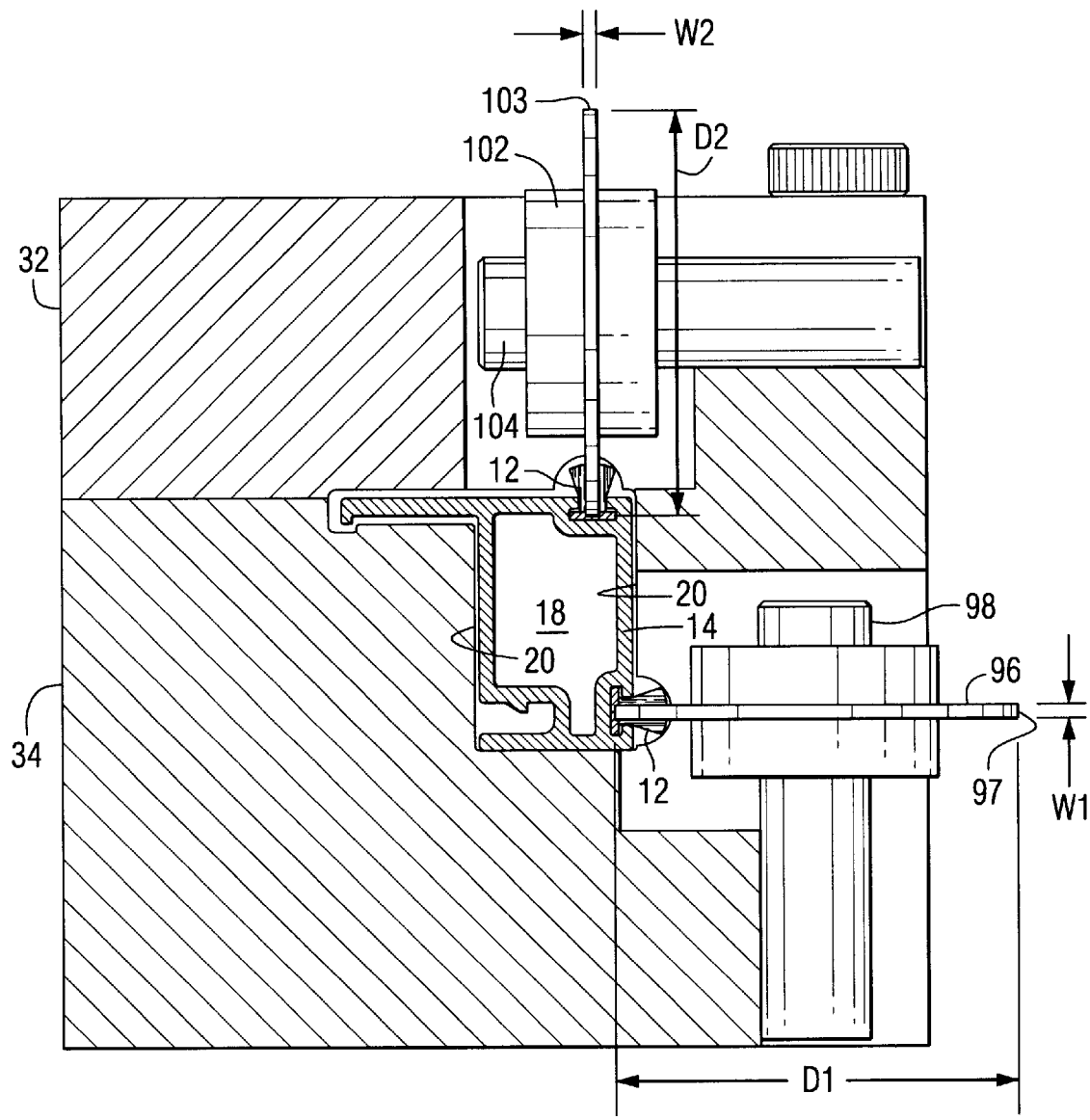
FIG. 3 is a cross-section of the insertion mask shown in FIGS. 1 and 2 taken along the lines 3—3 of FIG. 2.
Figure 4:
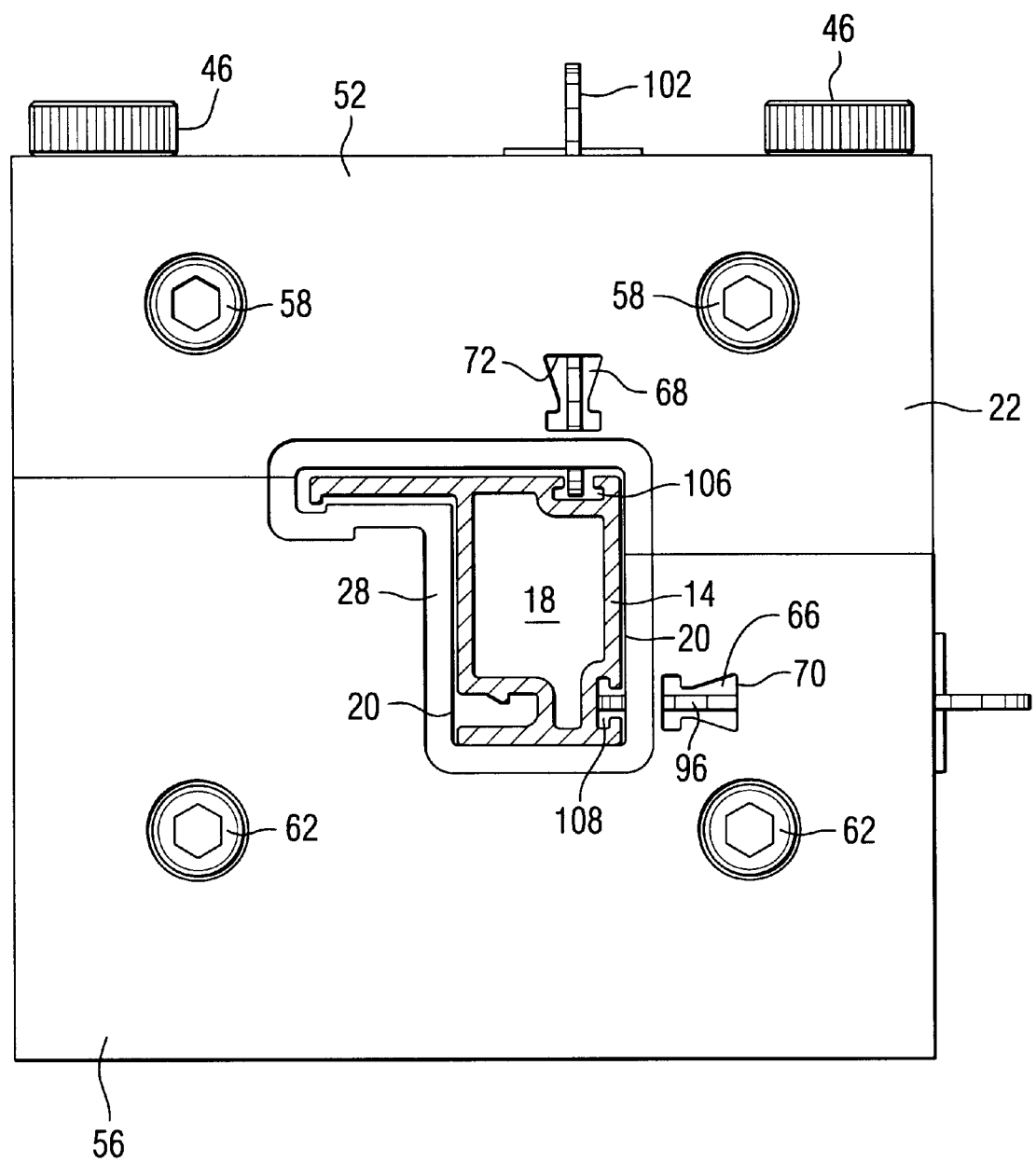
FIG. 4 is a front view of the insertion mask of FIGS. 1–3.
Figure 5:
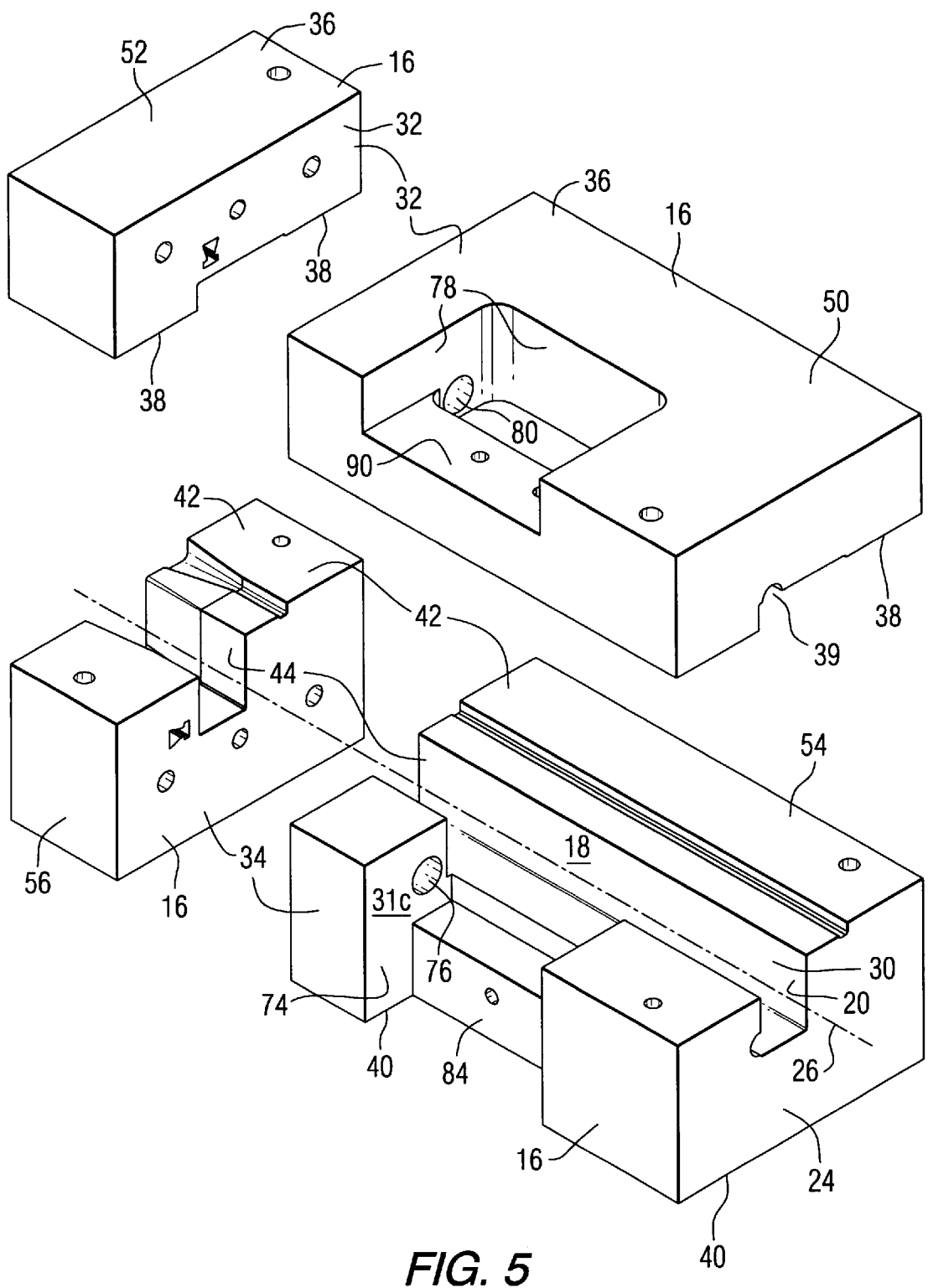
FIG. 5 is a reverse projection view of the guide block shown in FIG. 1.

As best shown in FIGS. 2–4, in the operation of the insertion mask 10, the extrusion 14 is fed into passageway 18 through the entry portal 28 and travels through passageway 18 until it passes out of exit portal 30. As the extrusion 14 passes through the passageway 18, lengths of weather stripping are also fed into entry portals 70 and 72 and pass out of exit portals 76 and 80. Exit portals 76 and 80 are located in close proximity to both passageway 18 and the perimeters 97 and 103 of rollers 96 and 102 respectively. The location of exit portals 76 and 80 is also selected such that they are proximate to pockets 106 and 108 that are formed in extrusion 14. In this way, the weather stripping is delivered in close proximity to one of pockets 106 or 108 and a respective one of rollers 96 or 102. Rollers 96 and 102 are located on guide block 16 such that the perimeter 97 and 103 of rollers 96 and 102 are adjacent to exit portals 76 and 80 and extend inside an envelope defined by extending the profile of exit portal 30 along longitudinal axis 18. The location of perimeters 97 and 103 of rollers 96 and 102 is such that rollers 96 and 102 engage weather strips 12 and press the weather strips into the respective pockets 106 and 108 of extrusion 14.

To compensate for minor changes that occur due to component wear or deviations in the size of extrusion 14 and/or weather stripping 12, rollers 96 and 102 are adjustable by movement of roller blocks 82 and 88 on mounting surfaces 84 and 90 respectively. This is accomplished by providing slots 110 and 112 in roller blocks 82 and 88 respectively. Bolts 86 and 92 which secure the roller blocks 82 and 88 to the guide block 16 pass through slots 110 and 112 respectively. Thus, the position of the perimeter 97 and 103 can be adjusted by loosening bolts 86 or 92 and sliding roller blocks 82 or 88 to vary the position of slots 110 and 112 with respect to bolts 86 and 92 and guide block 16. This adjustment allows a change in the position of roller blocks 82 and 88 that makes the roller blocks adjustable in a direction that is generally orthogonal to the longitudinal axis 26 of passageway 18 of the guide block 16.

In some cases, it may also be preferable for the roller block 82 or 88 to be angularly adjustable with respect to the longitudinal axis 26 of passageway 18 of guide block 16. That is, it may be preferable to make the orientation of axles 98 and 104 adjustable within a given angular range with respect to longitudinal axis 26 of passageway 18. Such an adjustment may, for example, allow the rollers 96 and 102 to better track the weather strips 12 as the weather strips are rolled into pockets 106 and 108.

To accomplish such angular adjustment, slots 110 and 112 are made wide enough to allow the desired range of angular motion ($£_1$ and $£_2$) of guide blocks 82 and 88 before the sides 114 and 116 of slots 110 and 112 respectively, contact bolts 86 and 92.

While a presently preferred embodiment of the disclosed invention is shown and described herein, the disclosed invention is not expressly limited thereto, but can also be otherwise variously embodied within the scope of the following claims.

We claim:

1. An insertion mask for installing weather stripping in a pocket that is defined within a lineal extrusion, said insertion mask comprising:

a guide block that defines a passageway therein, said passageway having a lateral cross-section that defines a profile having a shape and dimensions corresponding to the shape and dimensions of the lineal extrusion, such that said lineal extrusion can be received in such passageway, the shape and dimensions of said profile being within given tolerances of the lateral profile of said lineal extrusion such that said guide block limits the movement of said lineal extrusion in the lateral direction at times when the lineal extrusion is located in said passageway;

a roller block that is secured to said guide block; and a roller and axle assembly having an axle that is connected to said roller block and having a roller that is mounted on said axle such that said roller angularly rotates on said axle, said roller being sized such that the perimeter of said roller is at a constant location with respect to the internal walls of the passageway of said guide block.

2. The insertion mask of claim 1 wherein said axle is substantially orthogonal to the longitudinal axis of the passageway of said guide block.

3. The insertion mask of claim 2 wherein the position of said roller block is adjustable with respect to said guide block, said roller block being adjustable in a direction that is generally orthogonal to the longitudinal axis of the passageway of said guide block.

4. The insertion mask of claim 3 wherein the position of said roller block is adjustable in a direction that is generally tangential to the longitudinal axis of the passageway of said guide block.

5. The insertion mask of claim 1 wherein the said roller block is angularly adjustable with respect to said guide block such that said axle is oriented within a given angular range with respect to the longitudinal axis of said passageway.

6. The insertion mask of claim 5 wherein said given angular range includes a position that is orthogonal with respect to the longitudinal axis of said passageway.

7. The insertion mask of claim 1 wherein said guide block includes an upper portion and a lower portion, said upper and lower portions being secured together by at least one fastener with the passageway being defined between the upper and lower portions.

8. The insertion mask of claim 1 wherein said guide block includes:

a base that defines a passageway therein, the passageway of said base having a lateral cross-section that defines a given profile; and a feed block that defines an external face and an internal face, said feed block being secured to said base such that the internal face opposes the surface of said base, said feed block defining an internal passageway, said passageway having an opening in the internal face, the profile of such opening corresponding to the profile that is defined by the passageway of said base, said internal passageway of said feed block defining an opening in the external face of said feed block, the opening in the external face being larger than the opening in the internal face.

9. The insertion mask of claim 8 where said guide block defines an internal passageway between said external face and said internal face, at least a portion of the internal passageway of said guide block being funneled such that dimensions of the opening in the external face are larger than the dimension of the opening in the internal face.

10. The insertion mask of claim 9 wherein said feed block includes:

an upper guide portion that defines a lower surface; and a lower guide portion that defines an upper surface and that is secured to said upper guide portion by at least a fastener, the passageway of said feed block being defined between the upper surface of the lower guide portion and the lower surface of the upper guide portion.

11. The insertion mask of claim 1 further comprising:

a second roller block that is secured to said guide block; and a second roller and axle assembly, said second roller and axle assembly having an axle that is connected to said second roller block, and also having a roller that is mounted on said axle such that said roller angularly rotates in said angle, said roller being sized such that the perimeter of said roller is at a constant location with respect to the walls of the passageway of said guide block, the axle of said second roller and axle assembly being substantially orthogonal to the axle of said first roller and axle assembly.

12. The insertion mask of claim 1 where said guide block further includes at least one weather strip feed passageway, said weather strip feed passageway having a lateral profile that generally corresponds to the lateral profile of the weather strip, said feed passageway defining a first opening in the feed side of the guide block and also defining a second opening in the feed block adjacent to the perimeter of said roller and also adjacent to the passageway of said guide block.

13. The insertion mask of claim 1 wherein said guide block defines at least one wheel well that receives said roller and axle assembly.

* * * * *